United States Patent
Kipp (10) Patent No.: US 11,226,019 B2
(45) Date of Patent: Jan. 18, 2022

(54) CARBON BRAKE STACK ASSEMBLY FOR IMPROVED LIFE

(71) Applicant: GOODRICH CORPORATION, Charlotte, NC (US)

(72) Inventor: Richard A. Kipp, Oakwood, OH (US)

(73) Assignee: Goodrich Corporation, Charlotte, NC (US)

( * ) Notice: Subject to any disclaimer, the term of this patent is extended or adjusted under 35 U.S.C. 154(b) by 183 days.

(21) Appl. No.: 16/588,186

(22) Filed: Sep. 30, 2019

(65) Prior Publication Data

US 2021/0095728 A1 Apr. 1, 2021

(51) Int. Cl.
*F16D 55/36* (2006.01)
*B64C 25/42* (2006.01)
*F16D 125/58* (2012.01)

(52) U.S. Cl.
CPC .............. *F16D 55/36* (2013.01); *B64C 25/42* (2013.01); *F16D 2125/585* (2013.01); *F16D 2200/0047* (2013.01); *F16D 2200/0052* (2013.01)

(58) Field of Classification Search
CPC ............... F16D 55/36; F16D 2125/585; F16D 2200/0047; F16D 2200/0052; B64C 25/42
See application file for complete search history.

(56) References Cited

U.S. PATENT DOCUMENTS

| | | | |
|---|---|---|---|
| 2,518,016 A | * | 8/1950 | Johnson ............... F16D 65/853 188/71.5 |
| 4,207,969 A | | 6/1980 | Howell |
| 4,279,330 A | | 7/1981 | Pottorff et al. |
| 5,603,395 A | * | 2/1997 | Mabee .................... F16D 55/36 188/171 |
| 8,634,971 B2 | | 1/2014 | Cahill |
| 8,662,277 B2 | | 3/2014 | Schoon |
| 9,593,726 B2 | | 3/2017 | Chambard et al. |
| 9,669,810 B2 | | 6/2017 | Spray |
| 2005/0276961 A1 | | 12/2005 | Sherwood |

FOREIGN PATENT DOCUMENTS

EP 0138345 4/1985

OTHER PUBLICATIONS

European Patent Office, European Search Report dated Jun. 19, 2020 in Application No. 19216082.8.

* cited by examiner

*Primary Examiner* — Pamela Rodriguez
(74) *Attorney, Agent, or Firm* — Snell & Wilmer L.L.P.

(57) ABSTRACT

A brake stack is disclosed. The brake stack comprises a first stator, a second stator, and a first rotor disposed between the first stator and the second stator. The brake stack further comprises a first spring disposed between the first stator and the second stator. The first spring is disposed radially inward of the first rotor. The first spring is disposed axially between the first stator and the second stator. The first spring is configured to partially compress when a force applied to a pressure plate of the brake stack is less than a threshold force.

16 Claims, 8 Drawing Sheets

SECT A-A

FIG. 3

SECT A-A

CARBON BRAKE STACK ASSEMBLY FOR IMPROVED LIFE

FIELD

The present disclosure relates to carbon-carbon (carbon) and ceramic matrix composite (CMC) braking systems, and more specifically to improve wear life for carbon and CMC friction disks of aircraft braking systems.

BACKGROUND

Aircraft carbon and CMC brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. During taxi out, carbon friction disks in particular are colder and quicker to wear than when the friction disks are hotter.

SUMMARY

A carbon and CMC brake stack is disclosed herein. In various embodiments, the brake stack comprises a first stator having a first stator radially inner end; a first rotor disposed axially adjacent to the first stator, the first rotor having a first rotor radially inner end; a second stator disposed axially adjacent to the first rotor; and a first spring disposed axially between the first stator and the second stator and radially between the first stator radially inner end and the first rotor radially inner end.

In various embodiments, the first spring may be a wave spring. The brake stack may further comprise a pressure plate disposed a proximal end of the brake stack, wherein the first spring is configured to partially compress when a force is applied to the pressure plate that is less than a threshold force. A first stator axial face of the first stator may be separated from a first rotor axial face of the first rotor when the first spring is partially compressed. The threshold force may correspond to a threshold pressure between 600 psi and 800 psi. The brake stack may further comprise a pressure plate disposed at a proximal end of the brake stack, wherein the first spring is configured to fully compress when a force is applied to the pressure plate that is greater than a threshold force. A first stator axial face of the first stator may contact a first rotor axial face of the first rotor when the first spring is fully compressed. The brake stack may further comprise: a second rotor disposed axially adjacent to the second stator, the second rotor having a second rotor radially inner end; a third stator disposed axially adjacent to the second rotor; and a second spring disposed axially between the second stator and the third stator and radially between a second stator radially inner end of the second stator and the second rotor radially inner end. The second spring may be a second wave spring.

A multi-disk carbon and CMC brake system is disclosed herein. In various embodiments, the multi-disk carbon and CMC brake system comprises: a pressure plate; an end plate disposed distal to the pressure plate; a plurality of rotors disposed between the pressure plate and the end plate; a plurality of stators disposed between the pressure plate and the end plate, the plurality of stators interleaved between the plurality of rotors; and a first spring disposed between a first stator in the plurality of stators and an adjacent stator in the plurality of stators, the first spring disposed radially inward of a first rotor in the plurality of rotors.

In various embodiments, the first spring comprises a wave spring. The first spring may be configured to partially compress when a force is applied to the pressure plate that is less than a threshold force. A first stator axial face of the first stator may be separated from a first rotor axial face of the first rotor when the first spring is partially compressed. The threshold force may correspond to a threshold pressure between 600 psi and 800 psi. The first spring may be configured to fully compress when a force is applied to the pressure plate that is greater than a threshold force. A first stator axial face of the first stator may contact a first rotor axial face of the first rotor when the first spring is fully compressed. The multi-disk brake system may further comprise a plurality of the first spring. The plurality of the first spring may be disposed circumferentially about the first stator.

A method of using a multi-disk carbon and CMC brake system is disclosed herein. In various embodiments, the method comprises: applying a force to a pressure plate of the multi-disk carbon and CMC brake system comprising a brake stack; compressing a spring between a first stator and a second stator. In various embodiments, the method may further comprise: using a portion of disks in the brake stack if the force is less than a threshold force; and using all disks in the brake stack if the force is greater than the threshold force.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Disclosed herein, according to various embodiments, is a multi-disk carbon and CMC brake system. The multi-disk carbon and CMC brake system includes a plurality of rotors interleaved between a plurality of stators, a pressure plate at a proximal end, an end plate at a distal end, and at least one spring. As described in greater detail below, the spring may be disposed between a first stator and a second stator and radially inward of a rotor. The spring may be configured to allow a portion of the rotors and stators to supply the braking when a force applied to the pressure plate is below a threshold force. Additionally, the spring may be configured to allow all the rotors and stators to supply the braking when a force applied to the pressure plate is above the threshold force. Carbon composite disks may wear quicker when they are cold. By only using a first portion of disks when a lower brake force is used, the disks being used may heat up more quickly increasing the life of the disks being used and/or reducing the number of cold taxis experienced. Additionally, by not using a second portion of disks when a lower brake force is used, the second portion of disks may have significantly increased life. As such, at overhaul, the first portion of disks may be replaced, and the second portion of disks may remain, reducing cost and time at overhaul.

Figure 1:
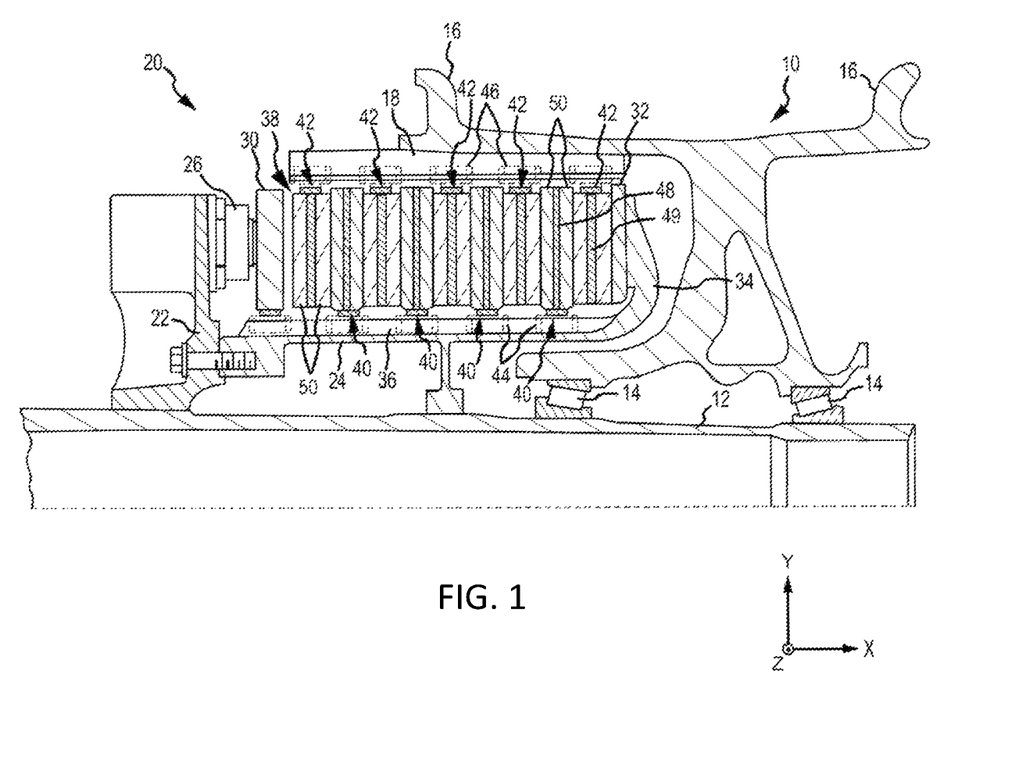
FIG. 1 illustrates a cross-sectional view of a multi-disk carbon and CMC brake system, in accordance with various embodiments.

Referring to FIG. 1, a multi-disk carbon and CMC brake system 20 is illustrated according to various embodiments. The system may include a wheel 10 supported for rotation around axle 12 by bearings 14. Axle 12 defines an axis of multi-disk carbon and CMC brake system 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk carbon and CMC brake system 20. Multi-disk carbon and CMC brake system 20 includes torque flange 22, torque tube 24, a plurality of pistons/actuators 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk carbon and CMC brake system 20 also includes a plurality of friction disks 38. Each friction disk 38 may comprise a solid disk, split disk or friction wear liners and core. The plurality of friction disks 38 includes at least one friction wear liners with a non-rotatable core, also known as a stator 40, and at least one friction disk wear liners with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and wear liners 50. Rotors 42 may comprise a rotor core 49 and wear liners 50. Each friction disk 38 includes an attachment structure. In the embodiment of FIG. 1, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon or CMC composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons/actuators 26 are connected to torque flange 22 at circumferentially spaced positions around torque flange 22. Pistons/actuators 26 face axially toward wheel 10 and contact a side of pressure plate 30 opposite friction disks 38. Pistons/actuators 26 may be powered electrically, hydraulically, or pneumatically.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32.

Figure 2:
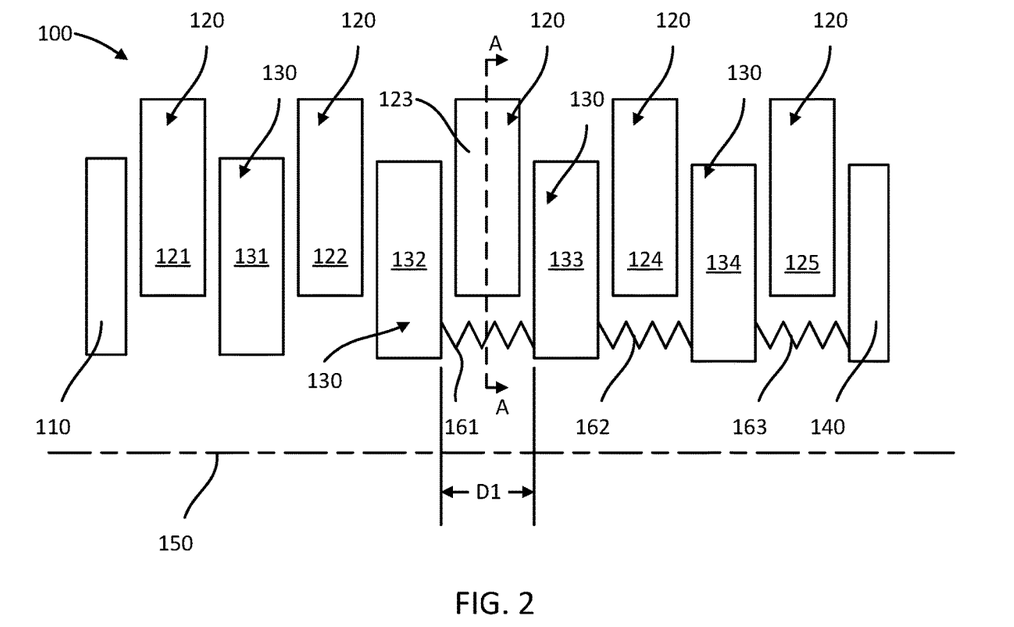
FIG. 2 illustrates a portion of a multi-disk carbon and CMC brake system prior to actuation, in accordance with various embodiments.

FIG. 2 illustrates a portion of a multi-disk carbon and CMC brake system 20 from FIG. 1 prior to actuation of the multi-disk carbon and CMC brake system 20, in accordance with various embodiments, is depicted. In various embodiments, the multi-disk carbon and CMC brake system 20 from FIG. 1 comprises a brake stack 100. The brake stack 100 comprises a pressure plate 110 at a proximal end of the brake stack 100 and an end plate 140 at a distal end of the brake stack 100. The brake stack 100 comprises a plurality of rotors 120 disposed between the pressure plate 110 and the end plate 140. The brake stack 100 further comprises a plurality of stators 130 interleaved between the plurality of rotors 120. The brake stack further comprises a centerline 150 about which the plurality of rotors 120 rotate. When the brake stack 100 is in a non-actuated state (e.g., not in use/operation), each rotor in the plurality of rotors 120 is separated from each stator in the plurality of stators by a gap. In various embodiments, the gap is between 0.06 inches and 0.10 inches (0.15 cm-0.26 cm), or between 0.065 inches and 0.095 inches (0.17 cm-0.25 cm), or between 0.07 inches and 0.09 inches (18 cm-0.23 cm).

In various embodiments, the plurality of rotors 120 comprises a first rotor 121 disposed proximate the pressure plate 110. The first rotor 121 is axially adjacent to the pressure plate 110. In various embodiments, the plurality of stators 130 comprises a first stator 131 disposed proximate the first rotor 121. The first stator 131 is axially adjacent to the first rotor 121. In various embodiments, the plurality of rotors 120 further comprises a second rotor 122, a third rotor 123, a fourth rotor 124, and a fifth rotor 125. In various embodiments, the plurality of stators 130 further comprises a second stator 132, a third stator 133, and a fourth stator 134. Although depicted as a brake stack comprising five rotors and four stators, any number of rotors and stators is within the scope of this disclosure. The second rotor 122 is disposed axially adjacent to the first stator 131 and the second stator 132. The third rotor 123 is disposed axially adjacent to the second stator 132 and the third stator 133. The fourth rotor 124 is disposed axially adjacent to the third stator 133 and the fourth stator 134. The fifth rotor 125 is disposed axially adjacent to the fourth stator 134 and the end plate 140.

In various embodiments, each rotor in the plurality of rotors 120 is disposed along a radially outward from centerline 150 in relation to each stator in the plurality of stators 130. In various embodiments, the pressure plate 110 and the end plate 140 are radially aligned with the plurality of stators 130.

In various embodiments, the brake stack 100 further comprises a first spring 161. The first spring 161 may be disposed between the second stator 132 and the third stator 133. The first spring 161 may be coupled to a circumferential portion of the second stator 132 proximate a radially inner end of the second stator 132 and a circumferential portion of the third stator 133 proximate a radially inner end of the third stator 133 by any method known in the art. In various embodiments, the first spring 161 is a free component and installed in a compressed state or an uncompressed state. In various embodiments, the first spring 161 is a wave spring, a coiled wave spring, a scrowave spring, or any other spring known in the art. In various embodiments, the first spring 161 is made of stainless steel, such as A-286 stainless steel, 17-4 PH stainless steel, 15-5 PH stainless steel, or the like. In various embodiments, the first spring 161 is made of any high temperature metal known in the art, such as a nickel alloy, cobalt, or the like.

In various embodiments, the first spring 161 is installed in an uncompressed state at its free height. In various embodiments, "free height," as disclosed herein, is a spring distance between two components when the spring is in an uncompressed state. The first spring 161 may have a free height measured in the axial direction that is substantially equal to, or less than, a distance D1 between the second stator 132 and the third stator 133. In various embodiments, a gap between a stator and an adjacent rotor is a function of the available brake running clearance. The running clearance may be a design choice based on the design intent of a multi-disk brake system.

In various embodiments, the brake stack 100 comprises a second spring 162. The second spring 162 may be disposed between the third stator 133 and the fourth stator 134. The second spring 162 may be coupled to a circumferential portion of the third stator 133 proximate a radially inner end of the third stator 133 and a circumferential portion of the fourth stator 134 proximate a radially inner end of the fourth stator 134. The second spring 162 may be the same type of spring or a different type of spring as the first spring 161. In various embodiments, the second spring 162 is the same type of spring as the first spring 161.

In various embodiments, the brake stack 100 comprises a third spring 163. The third spring 163 may be disposed between the fourth stator 134 and the end plate 140. The third spring 163 may be coupled to a circumferential portion of the fourth stator 134 proximate a radially inner end of the fourth stator 134 and a circumferential portion of the end plate 140 proximate a radially inner end of the end plate 140. The third spring 163 may be the same type of spring or a different type of spring as the first spring 161. In various embodiments, the second spring 162 is the same type of spring as the first spring 161.

Figure 3:
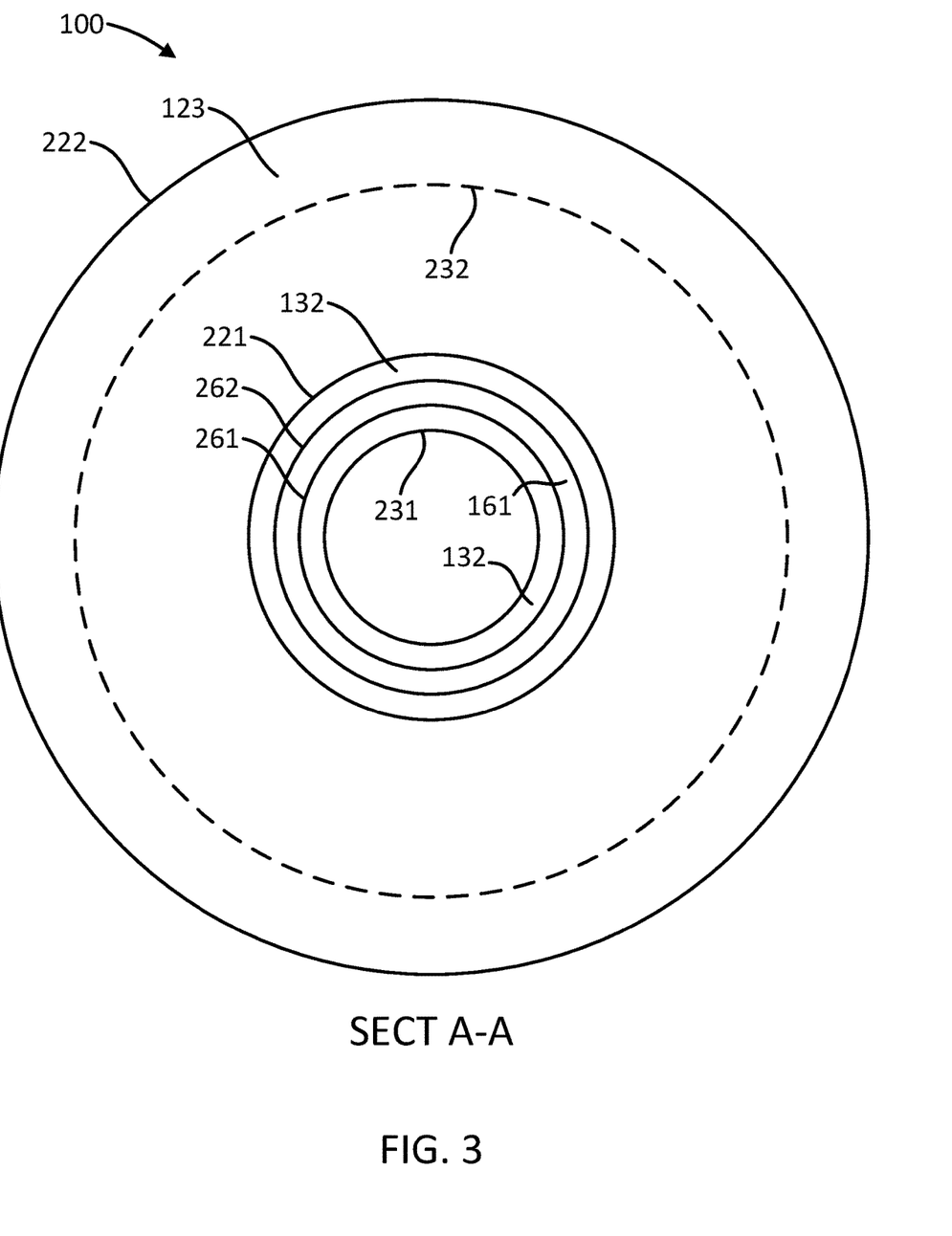
FIG. 3 illustrates a cross-sectional view of brake stack, in accordance with various embodiments.

Referring now to FIG. 3, a cross-sectional view of brake stack 100 along section A-A from FIG. 2 is depicted, in accordance with various embodiments. The third rotor 123 comprises a radially inner end 221 and a radially outer end 222. The second stator 132 comprises a radially inner end 231 and a radially outer end 232. Radially outer end 232 of second stator 132 is illustrated as a hidden line in section A-A as it is hidden from view in section A-A because it is behind third rotor 123. In various embodiments, first spring 161 comprises a radially inner end 261 and a radially outer end 262. In various embodiments, first spring 161 is disposed between radially inner end 221 of third rotor 123 and radially inner end 231 of second stator 132.

Figure 4:
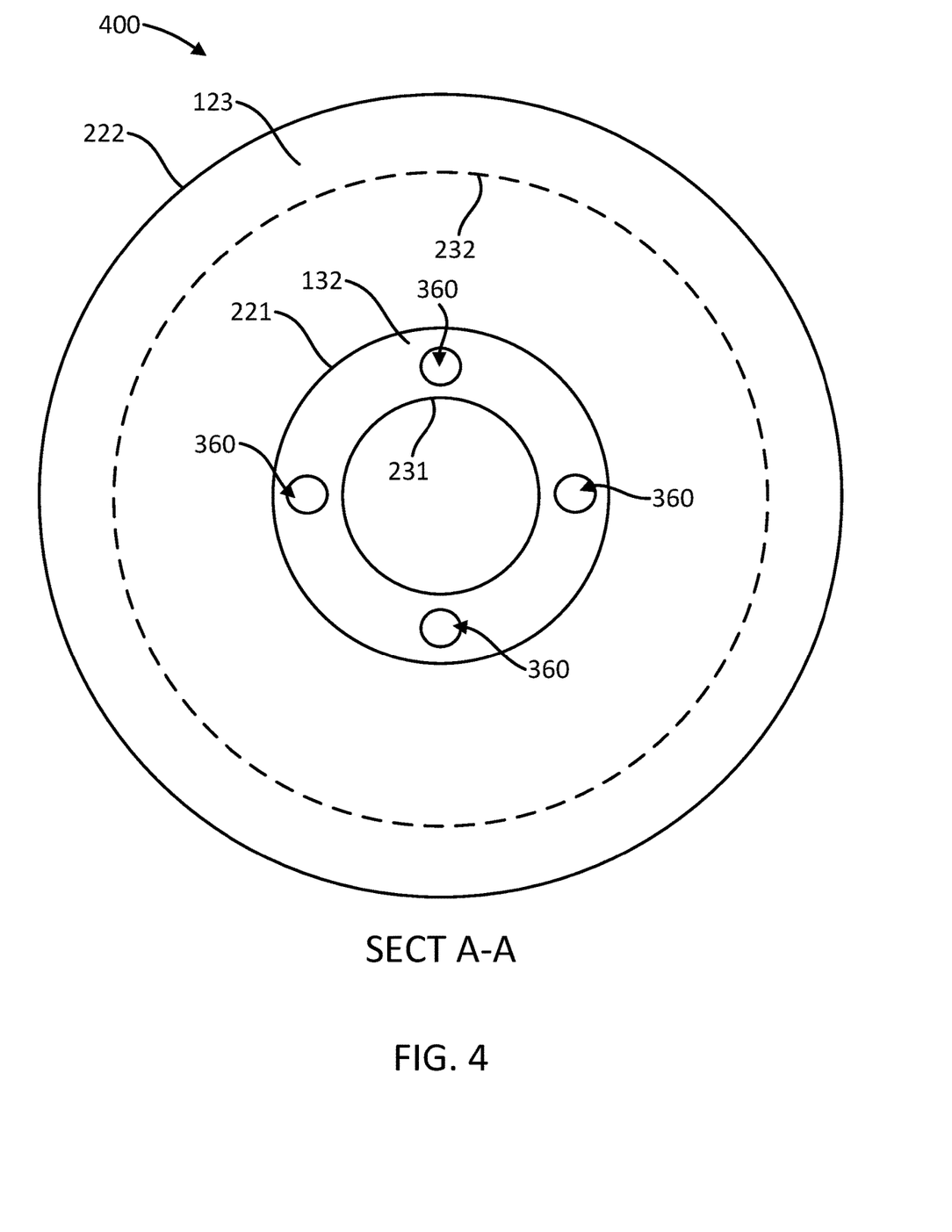
FIG. 4 illustrates a cross-sectional view of brake stack, in accordance with various embodiments.

Referring now to FIG. 4, a cross-sectional view of a brake stack 400 along section A-A from FIG. 2 is depicted, in accordance with various embodiments. In various embodiments, the brake stack 400 comprises a plurality of springs 360 disposed circumferentially around second stator 132. In various embodiments, each spring in the plurality of springs 360 is disposed between radially inner end 221 of the third rotor 123 and radially inner end 231 of the second stator 132. In various embodiments, each spring in the plurality of springs 360 is a coil spring, or any other spring known in the art.

Figure 5:
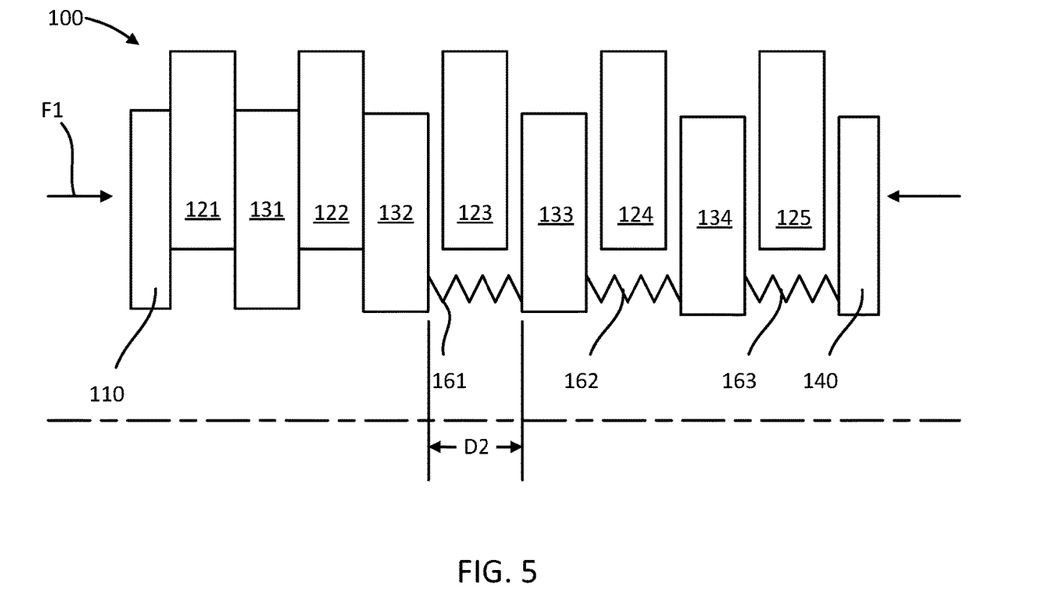
FIG. 5 illustrates a portion of a multi-disk carbon and CMC brake system during actuation below a threshold force, in accordance with various embodiments.

Referring now to FIG. 5, a portion of a multi-disk carbon and CMC brake system 20 from FIG. 1 during actuation of the multi-disk carbon and CMC brake system 20 in a first type of braking event, in accordance with various embodiments, is depicted. A "first type of braking event," as described herein, is braking to slow an aircraft during taxi, a non-emergency landing, or the like. In various embodiments, a first type of braking event occurs at a braking pressure applied to the brake stack 100 that is less than a threshold brake pressure. A threshold brake pressure may be a design choice and vary based on design intent. For example, a threshold brake pressure may be between 600 psi and 800 psi (4137 kPa-5516 kPa), or 650 psi and 750 psi (4482 kPa-5860 kPa), or between 675 psi and 725 psi (4654 kPa-4999 kPa).

During a first type braking event, the first spring 161 is partially compressed to a height of D2. In various embodiments, D2 is less than D1. In various embodiments, D2 is between 0.01 inches and 0.16 inches less than D1. In a first braking event, pressure plate 110 is actuated axially toward end plate 140. An axial face of pressure plate 110 contacts a first axial face of first rotor 121, a second axial face of first rotor 121 contacts a first axial face of first stator 131, a second axial face of first stator 131 contacts a first axial face of second rotor 122, and a first axial face of second stator 132. In various embodiments, due to the partial compression of first spring 161, a second axial face of second stator 132 is separated from a first axial face of third rotor 123 by a gap. Similarly, due to the partial compression of first spring 161, a second axial face of third rotor 123 is separated from a first axial face of third stator 133 by a gap. By limiting the brake stack to only utilizing two rotors and two stators during a first braking event, the number of landing cycles experienced by the unutilized disks is effectively reduced. For carbon disks in particular, the rotors and stators in use may heat up quicker resulting in greater wear life compared to a typical brake stack utilizing all rotors and stators.

In various embodiments, second spring 162 and third spring 163 may be partially compressed as well during a first braking event. Due to the partial compression of second spring 162, a second axial face of third stator 133 is separated from a first axial face of fourth rotor 124 by a gap, and a second axial face of fourth rotor 124 is separated from a first axial face of fourth stator 134 by a gap. Similarly, due to the partial compression of third spring 163, a second axial face of fourth stator 134 is separated from a first axial face of fifth rotor 125 by a gap, and a second axial face of fifth rotor 125 is separated from a first axial face of end plate 140 by a gap.

Figure 6:
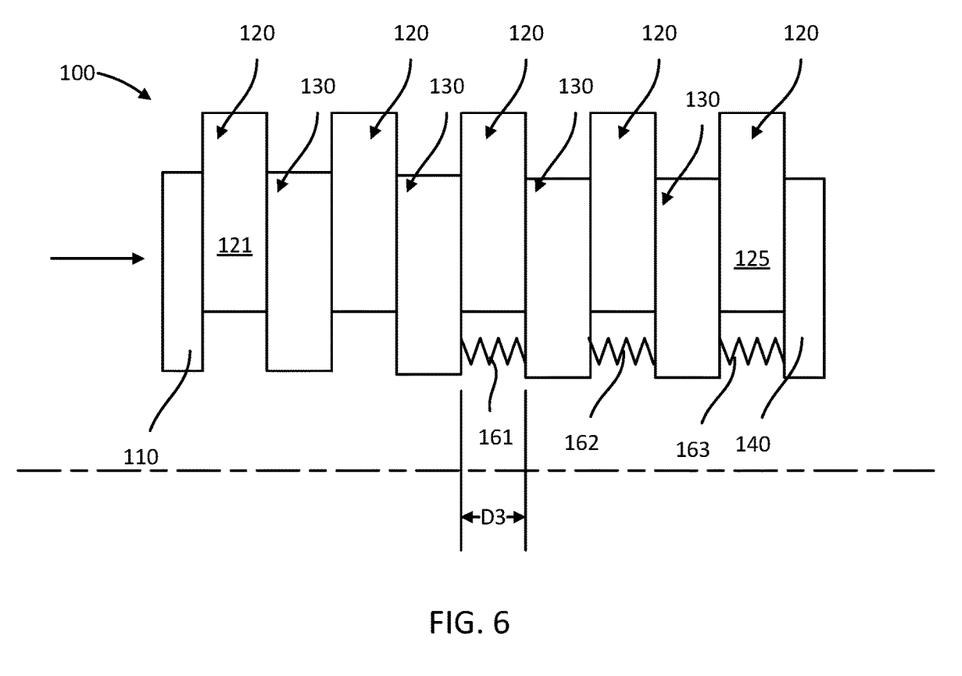
FIG. 6 illustrates a portion of a multi-disk carbon and CMC brake system during actuation above a threshold force, in accordance with various embodiments.

Referring now to FIG. 6, a portion of a multi-disk carbon and CMC brake system 20 from FIG. 1 during actuation of the multi-disk carbon and CMC brake system 20 in a second type of braking event, in accordance with various embodiments, is depicted. A second type of braking event, as described herein, is braking during performance and emergency landings, service stops, or the like. In various embodiments, a second type of braking event occurs at a braking pressure applied to the brake stack 100 that is greater than a threshold brake pressure. In various embodiments, the threshold brake pressure may be between 600 psi and 800 psi (4137 kPa-5516 kPa).

During a second type braking event, an axial face of each rotor in the plurality of rotors 120 contacts an axial face of an adjacent stator in the plurality of stators 130. Additionally, an axial face of pressure plate 110 contacts an axial face of first rotor 121, and an axial face of fifth rotor 125 contacts an axial face of end plate 140. During the second type braking event the first spring 161 is fully compress to a height of D3. In various embodiments, the height D3 is less than the height D2 from FIG. 5 during a first type braking event. In various embodiments, D3 is substantially equal to a width of a rotor in the plurality of rotors 120.

Figure 7:
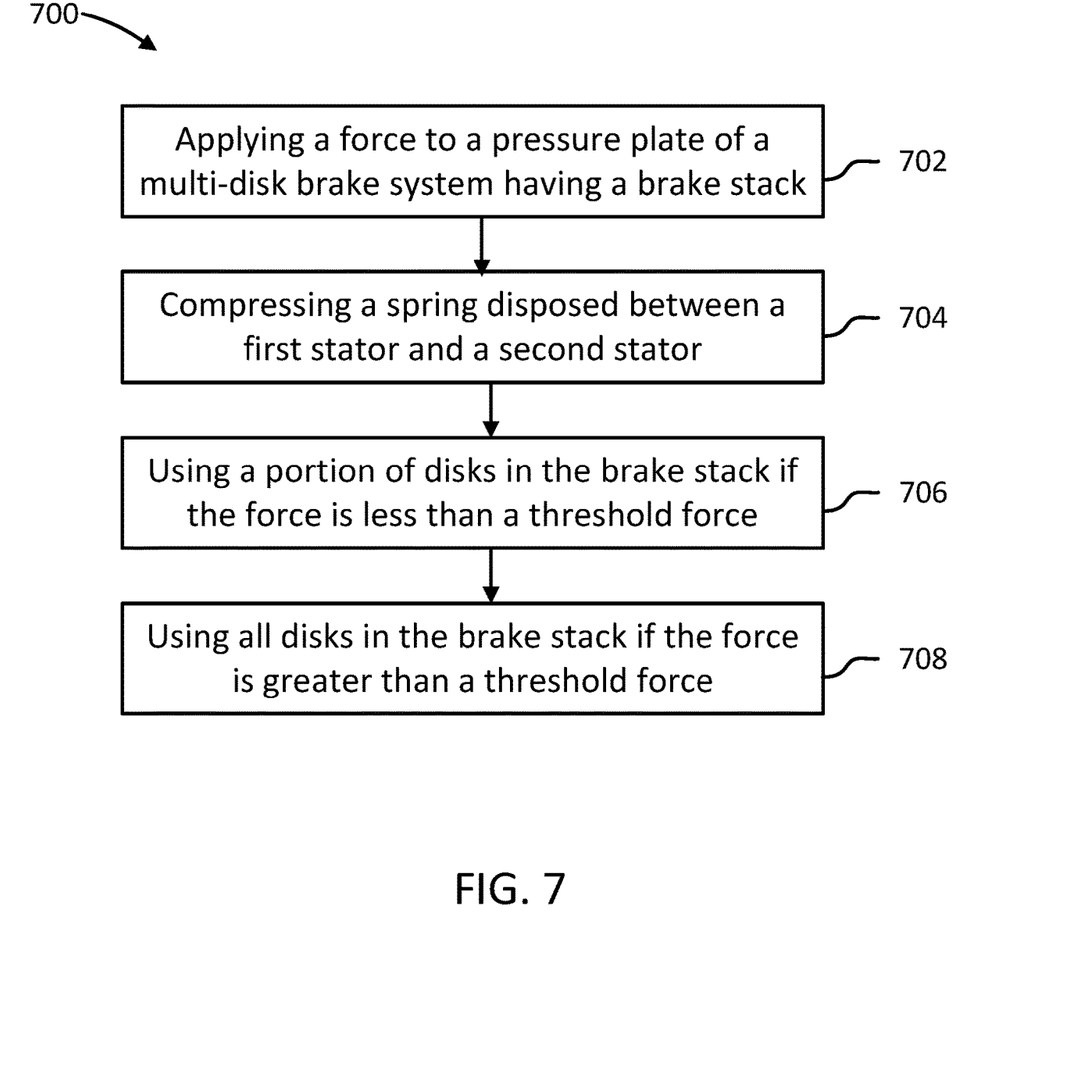
FIG. 7 illustrates a method of using a multi-disk carbon and CMC brake system, in accordance with various embodiments.

Referring now to FIG. 7, a method 700 of using a multi-disk carbon and CMC brake system, in accordance with various embodiments, is depicted. The method comprises applying a force to a pressure plate of a multi-disk carbon and CMC brake system (step 702). The force is applied in the axial direction. The multi-disk carbon and CMC brake system may comprise a brake stack in accordance with FIGS. 1-6. The method further comprises compressing a spring disposed between a first stator in a plurality of stators and a second stator in a plurality of stators (step 704). A plurality of rotors are interleaved between the plurality of stators, as depicted in FIGS. 1-6. The method further comprises using a portion of disks in the brake stack if the force is less than a threshold force (step 706). For example, a portion of disks may comprise at least one rotor and at least one stator. In various embodiments, the threshold force corresponds to a threshold pressure. In various embodiments, the threshold pressure is between 600 psi and 800 psi (4137 kPa-5516 kPa), or 650 psi and 750 psi (4482 kPa-5860 kPa), or between 675 psi and 725 psi (4654 kPa-4999 kPa). The method further comprises using all disks in the brake stack if the force is greater than the threshold force (step 708). For example, each rotor in a plurality of rotors contacts an adjacent stator in a plurality of stators when the force is greater than the threshold force.

Figure 8:
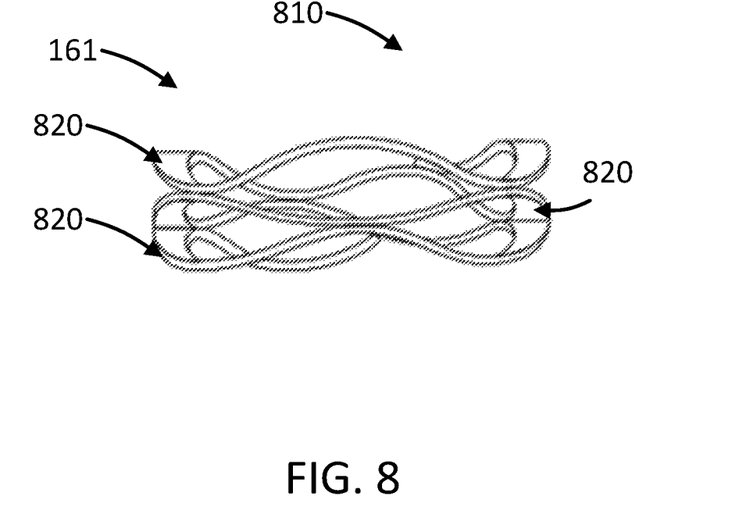
FIG. 8 illustrates a side view of a spring for use in a multi-disk carbon and CMC brake system, in accordance with various embodiments.

Referring now to FIG. 8, a first spring 161, in accordance with various embodiments, is illustrated. In various embodiments, first spring 161 comprises a wave spring 810. Wave spring 810 comprises a plurality of annular sheets 820. Each annular sheet in the plurality of annular sheets 820 has a sinusoidal shape along the circumference of the annular sheet. Each annular sheet in the plurality of annular sheets 820 is coupled to an adjacent annular sheet in the plurality of annular sheets 820 at a crest of the annular sheet and the adjacent annular sheet.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A carbon and ceramic matrix composite (CMC) brake stack comprising:
    a first stator having a first stator radially inner end;
    a first rotor disposed axially adjacent to the first stator, the first rotor having a first rotor radially inner end;
    a second stator disposed axially adjacent to the first rotor;
    a first spring disposed axially between the first stator and the second stator and radially between the first stator radially inner end and the first rotor radially inner end; and
    a pressure plate disposed at a proximal end of the brake stack, wherein:
        the first spring is configured to partially compress when a first force is applied to the pressure plate that is less than a threshold force, and
        the threshold force corresponds to a threshold effective pressure associated with an aircraft taxi stop or service landing.

2. The brake stack of claim 1, wherein the first spring is a first wave spring.

3. The brake stack of claim 2, further comprising:
    a second rotor disposed axially adjacent to the second stator, the second rotor having a second rotor radially inner end;
    a third stator disposed axially adjacent to the second rotor; and
    a second spring disposed axially between the second stator and the third stator and radially between a second stator radially inner end of the second stator and the second rotor radially inner end.

4. The brake stack of claim 3, wherein the second spring is a second wave spring.

5. The brake stack of claim 1, wherein a first stator axial face of the first stator is separated from a first rotor axial face of the first rotor when the first spring is partially compressed.

6. The brake stack of claim 1, wherein the first spring is configured to fully compress when a second force is applied to the pressure plate that is greater than the threshold force.

7. The brake stack of claim 6, wherein a first stator axial face of the first stator contacts a first rotor axial face of the first rotor when the first spring is fully compressed.

8. A multi-disk carbon and ceramic matrix composite (CMC) brake system comprising the brake stack of claim 1.

9. A multi-disk carbon and ceramic matrix composite (CMC) brake system, comprising:
    a pressure plate;
    an end plate disposed distal to the pressure plate;
    a plurality of rotors disposed between the pressure plate and the end plate;
    a plurality of stators disposed between the pressure plate and the end plate, the plurality of stators interleaved between the plurality of rotors;
    a first spring disposed between a first stator in the plurality of stators and an adjacent stator in the plurality of stators, the first spring disposed radially inward of a first rotor in the plurality of rotors; and
    a plurality of the first spring, wherein the plurality of the first spring are disposed circumferentially about the first stator.

10. The multi-disk carbon and CMC brake system of claim 9, wherein the first spring comprises a wave spring.

11. The multi-disk carbon and CMC brake system of claim 9, wherein the first spring is configured to partially compress when a force is applied to the pressure plate that is less than a threshold force.

12. The multi-disk carbon and CMC brake system of claim 11, wherein a first stator axial face of the first stator is separated from a first rotor axial face of the first rotor when the first spring is partially compressed.

13. The multi-disk carbon and CMC brake system of claim 12, wherein the threshold force corresponds to a threshold effective pressure associated with an aircraft taxi stop or service landing.

14. The multi-disk carbon and CMC brake system of claim 9, wherein the first spring is configured to fully compress when a force is applied to the pressure plate that is greater than a threshold force.

15. The multi-disk carbon and CMC brake system of claim 14, wherein a first stator axial face of the first stator contacts a first rotor axial face of the first rotor when the first spring is fully compressed.

16. A method of engaging a multi-disk carbon and ceramic matrix composite (CMC) brake system, the method comprising:
    applying a force to a pressure plate of the multi-disk carbon and CMC brake system comprising a brake stack;
    compressing a spring between a first stator and a second stator;
    engaging a portion of disks in the brake stack if the force is less than a threshold force; and
    engaging all disks in the brake stack if the force is greater than the threshold force, wherein the threshold force corresponds to a threshold effective pressure associated with an aircraft taxi stop or service landing.

\* \* \* \* \*